(12) United States Patent
Schlick et al.

(10) Patent No.: US 10,518,327 B2
(45) Date of Patent: Dec. 31, 2019

(54) DEVICE AND METHOD FOR ADDITIVELY PRODUCING AT LEAST ONE COMPONENT REGION OF A COMPONENT

(71) Applicant: MTU Aero Engines AG, Munich (DE)

(72) Inventors: Georg Schlick, Munich (DE); Friedrich Kuska, Niederroth (DE)

(73) Assignee: MTU Aero Engines AG, Munich (DE)

( * ) Notice: Subject to any disclaimer, the term of this patent is extended or adjusted under 35 U.S.C. 154(b) by 342 days.

(21) Appl. No.: 15/329,769

(22) PCT Filed: May 20, 2015

(86) PCT No.: PCT/DE2015/000260
§ 371 (c)(1),
(2) Date: Jan. 27, 2017

(87) PCT Pub. No.: WO2016/015694
PCT Pub. Date: Feb. 4, 2016

(65) Prior Publication Data
US 2018/0207721 A1    Jul. 26, 2018

(30) Foreign Application Priority Data
Jul. 30, 2014   (DE) .................. 10 2014 214 943

(51) Int. Cl.
*B29C 64/10*        (2017.01)
*B22F 3/105*        (2006.01)
(Continued)

(52) U.S. Cl.
CPC ............ *B22F 3/1055* (2013.01); *B08B 15/00* (2013.01); *B22F 5/009* (2013.01); *B29C 64/153* (2017.08);
(Continued)

(58) Field of Classification Search
CPC ................. B22F 3/1055; B22F 3/105; B22F 2003/1056; B22F 2003/1059; B29C 64/153
See application file for complete search history.

(56) References Cited

U.S. PATENT DOCUMENTS

| | | | | |
|---|---|---|---|---|
| 2015/0336330 | A1* | 11/2015 | Herzog | B22F 3/1055 264/406 |
| 2015/0367573 | A1* | 12/2015 | Okazaki | B29C 64/153 425/174.4 |
| 2017/0120330 | A1* | 5/2017 | Sutcliffe | B22F 3/1055 |

FOREIGN PATENT DOCUMENTS

| | | |
|---|---|---|
| DE | 102004031881 A1 | 1/2006 |
| DE | 102006041320 A1 | 3/2008 |

(Continued)

*Primary Examiner* — Jacob T Minskey
*Assistant Examiner* — Cedrick S Williams
(74) *Attorney, Agent, or Firm* — Barlow, Josephs & Holmes, Ltd.

(57) ABSTRACT

The invention relates to a device for additively producing at least one component region of a component, in particular a component of a turbomachine. The device can comprise at least one coating apparatus for applying at least one powder layer of a component material to at least one build-up and joining zone of at least one component platform, which can be lowered, wherein the coating apparatus can be moved in relation to the component platform. In addition, the device comprises at least one suction device for suctioning of process waste gases and/or particles. The coating apparatus thereby comprises at least one suction channel or at least one suction pipe, which has at least one suction opening oriented in the direction of the component platform.

7 Claims, 1 Drawing Sheet

Figure 1:
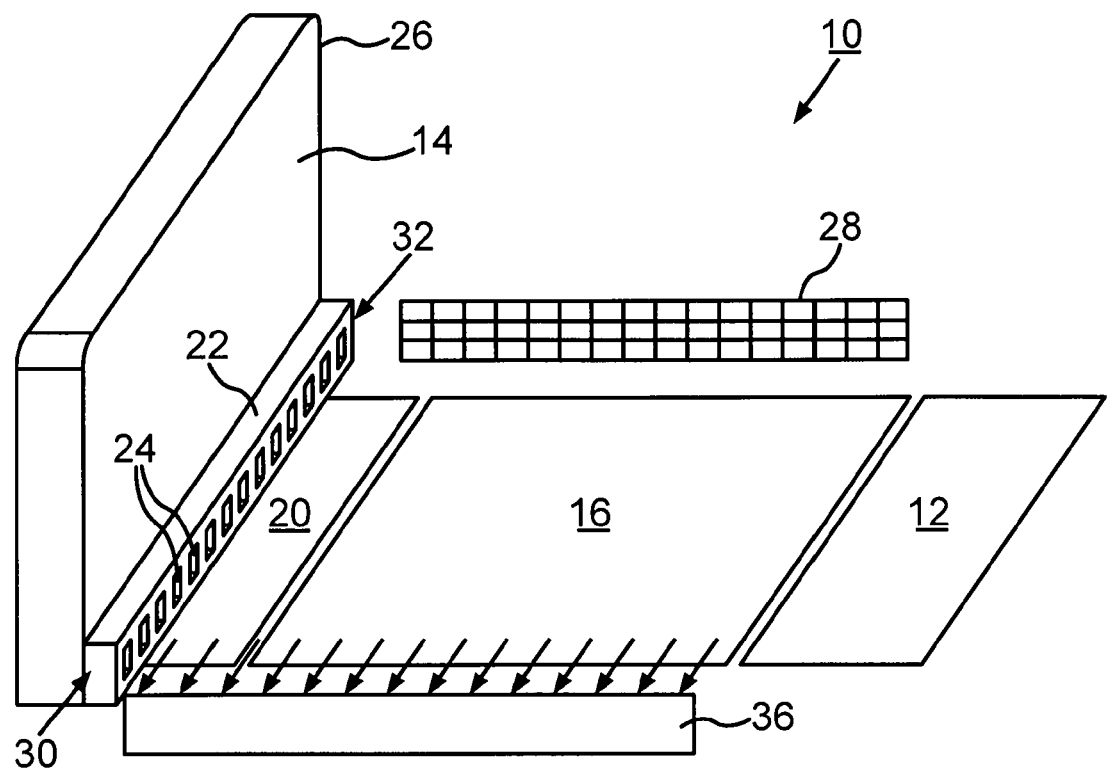

(51) Int. Cl.
*B08B 15/00* (2006.01)
*B22F 5/00* (2006.01)
*B29C 64/153* (2017.01)

(52) U.S. Cl.
CPC ... *B08B 2215/003* (2013.01); *B08B 2215/006* (2013.01); *B22F 2003/1056* (2013.01); *B22F 2003/1059* (2013.01); *Y02P 10/295* (2015.11)

(56) References Cited

FOREIGN PATENT DOCUMENTS

| | | |
|---|---|---|
| DE | 2009051479 A1 | 5/2011 |
| DE | 102010052206 A1 | 5/2012 |
| DE | 102012107297 A1 | 6/2014 |
| DE | 102014108061 A1 | 12/2014 |
| WO | 2014202413 A2 | 12/2014 |

* cited by examiner

DEVICE AND METHOD FOR ADDITIVELY PRODUCING AT LEAST ONE COMPONENT REGION OF A COMPONENT

BACKGROUND OF THE INVENTION

The invention relates to a device for additively producing at least one component region of a component, in particular a component of a turbomachine, in accordance with the present invention. The invention further relates to a method for additively producing at least one component region of a component in accordance with the as well as a coating apparatus for use in a device for additively producing at least one component region of a component in accordance with the the present invention.

Methods and devices for producing components are known in large number. In particular, additive manufacturing methods (so-called rapid manufacturing or rapid prototyping methods) are known in which the component is built up layer by layer by powder-bed-based, additive manufacturing methods. Predominantly metal components can be produced, for example, by laser beam or electron beam melting or sintering methods. In the process, at least one powdered component material is initially applied layer by layer onto a component platform in the region of a build-up and joining zone of the device. Subsequently, the component material is fused and/or sintered locally layer by layer by supplying energy to the component material in the region of the build-up and joining zone by means of at least one high-energy beam, such as, for example, an electron beam or laser beam. The high-energy beam is controlled in this case as a function of layer information for each component layer to be produced. After fusion and/or sintering have or has occurred, the component platform is lowered layer by layer by a predefined layer thickness. Afterwards, the named steps are repeated until the component has been completely finished.

Also known from prior art are, in particular, additive production methods for the production of components of a turbomachine, such as, for example, components of an aircraft engine or a gas turbine, one example being the method described in DE 10 2009 051 479 A1, and a corresponding device for producing a component of a turbomachine.

In this method, a corresponding component is produced by applying at least one powdered component material layerwise on a component platform in the region of a build-up and joining zone and local melting or sintering of the component material layer by layer by means of energy supplied in the region of a build-up and joining zone. The supply of energy in this process occurs via laser beams, such as, for example, $CO_2$ lasers, Nd:YAG lasers, and Yb fiber lasers as well as diode lasers or by electron beams. Usually, additive manufacturing methods of this kind are carried out under an atmosphere of protective gas, such as, for example, an argon- or nitrogen-enriched processing environment, in order to prevent the contamination of the component material with oxygen. In addition, gas or air flows can be passed flatly over the powder bed or the component platform. In this way, process contaminants are moved by a respective blowing device to a respective suction device.

However, regarded as a drawback in the known devices and methods is the circumstance that the removal of smolder, splatter, particles, and process waste gases created during the additive production method is possible only to an inadequate extent or at relatively high cost in terms of apparatus.

SUMMARY OF THE INVENTION

The problem of the present invention is therefore to create a device and a method of the kind mentioned in the introduction, which enable an improved removal of smolder, splatter, particles, and/or process waste gases at relatively low cost in terms of apparatus.

This problem is solved in accordance with the invention by a device for additively producing at least one component region of a component, by a method, as well as by a coating apparatus of the present invention. Advantageous embodiments with appropriate further enhancements of the invention are presented in the respective dependent claims, wherein advantageous embodiments of the device are to be regarded as advantageous embodiments of the method as well as of the coating apparatus and vice versa.

A first aspect of the invention relates to a device for additively producing at least one component region of a component, in particular a component of a turbomachine. In this case, the device comprises at least one coating apparatus for applying at least one powder layer of a component material onto at least one build-up and joining zone of at least one component platform, which can be lowered, wherein the coating apparatus can be moved in relation to the component platform, and at least one suction device for suctioning of process waste gases and/or particles. In addition, the coating apparatus comprises at least one suction channel or at least one suction pipe with at least one suction opening oriented in the direction of the component platform, wherein the suction channel or the suction pipe is arranged in such a way that, in a predefined standstill position of the coating apparatus outside of the component platform, the suction channel or the suction pipe is operatively connected to the suction device for diverting a gas flow and/or a particle flow. The arrangement of the suction channel or pipe at the coating apparatus enables smolder, splatter, particles, and/or process waste gases of the additive production process to be removed reliably from the build-up and joining zone. In a predefined standstill position of the coating apparatus, the suction channel or the suction pipe docks at the existing suction device of the device, so that the gas flow and/or particle flow existing in the region of the build-up and joining zone are or is diverted in such a way that smolder, splatter, particles, and/or process waste gases are conveyed, for example, directly into an overflow tank of the device. The solution according to the invention can be carried out advantageously with relatively little cost in terms of apparatus. Overall, the device according to the invention affords a marked increase in the quality of the additively produced components. In addition, process waste gases—insofar as desired—can be integrated again into the production process. The terms "arranged" or "arrangement" are to be understood in the sense that the suction channel or the suction pipe can be connected directly or indirectly to the coating apparatus. For example, a mechanical connection to the coating apparatus is possible. The relative movability of the coating apparatus in relation to the component platform can occur either by movement of the coating apparatus by means of an appropriate travel unit or by movement of the component platform. In the last-mentioned embodiment, it is possible, if need be, to dispense with a separate travel unit of the coating apparatus.

In another advantageous embodiment of the device according to the invention, the suction channel or the suction pipe is designed as a separate component and arranged at a housing of the coating apparatus. Advantageously, devices that are already present can be retrofitted with an appropriate suction channel or pipe, which is arranged at the coating apparatus, in a straightforward manner for additively producing components. The suction channel or the suction pipe can then be designed as a sheet metal part. However, it is also possible for the suction channel or the suction pipe to be designed in one piece with a housing of the coating apparatus. In this way, the number of components to be used is reduced.

In other advantageous embodiments of the device according to the invention, the suction device is arranged in the region of an overflow tank and/or in the region of a stock supply and/or metering tank of the device. The arrangement of the suction device in the region of the overflow tank ensures that the standstill position of the coating apparatus also lies in this region. This results in a coupling of the suction channel or the suction pipe to the suction device in the region of the overflow tank, as a result of which it is ensured that a large part of the resulting smolder, splatter, particles, and/or process waste gases is conveyed directly into the overflow tank. However, it is also possible to arrange the suction device additionally or exclusively in the region of the stock supply and/or metering tank of the device. It is also possible in this way to divert the gas flow and/or particle flow existing in the region of the build-up and joining zone, so that smolder, splatter, particles, and/or process waste gases are removed reliably from the build-up and joining zone of the device.

In another advantageous embodiment of the device according to the invention, said device comprises at least one gas supply device for supplying at least one gas and/or a process gas at least into the region of the component platform, in particular into the region of the build-up and joining zone. The supply of gas serves for active control of the flow ratios in this region. However, it is also possible via the gas supply device to supply a process gas in the form of an inert gas to the build-up and joining zone of the component platform for improvement of the joining quality of the resulting component. The process gas also can serve for active control of the flow ratios in this region.

In further advantageous embodiments of the device according to the invention, in such a case, the suction channel or the suction pipe has a first end and a second end, wherein the first end is designed so as to face the suction device and comprises at least one opening and, in the predefined standstill position of the coating apparatus, the opening comes into alignment at least in part with at least one opening of the suction device. In this way, it is ensured that the suction channel or the suction pipe becomes operatively connected to the suction device; that is, a gas- or fluid-conveying connection can be created. In addition, there exists the possibility for the opening of the first end of the suction channel or the suction pipe and/or the opening of the suction device to have a sealing lip. Advantageously, it is possible in this way to enhance the resulting suction effect at the suction channel or pipe. Likewise, the second end of the suction channel or of the suction pipe can be designed to be closed so as to enhance the suction effect.

A second aspect of the invention relates to a method for additively producing at least one component region of a component, in particular a component of a turbomachine. The method according to the invention in this case comprises at least the following steps: a) application of at least one powder layer of a component material by means of a coating apparatus onto at least one build-up and joining zone of at least one component platform, which can be lowered; b) local fusion and/or sintering of the component material layer by layer by supplying energy by means of at least one high-energy beam in the region of the build-up and joining zone in order to create a component layer; c) lowering of the component platform layer by layer by a predefined layer thickness; and d) repetition of steps a) to c) until the component region has been finished. During a predefined standstill position of the coating apparatus outside of the component platform, at least one suction channel arranged at the coating apparatus or at least one suction pipe arranged at the coating apparatus is operatively connected to a suction device in such a way that a diversion of a gas flow and/or particle flow occurs out of the buildup and joining zone in the direction of at least one suction opening of the suction channel or suction pipe oriented in the direction of the component platform. In this way, it is possible to achieve an especially reliable removal of smolder, splatter, process waste gases, as well as other undesired gases or particles from the region of the buildup and joining zone. In the predefined standstill position of the coating apparatus, the suction channel or the suction pipe docks at the existing suction device, so that the gas flow and/or particle flow existing in the region of the buildup and joining zone is diverted in such a way that smolder, splatter, particles, and/or process waste gases can be conveyed directly, for example, into an overflow tank.

A third aspect of the invention relates to a coating apparatus for use in a device for additively producing at least one component region of a component. In accordance with the invention, the coating apparatus comprises at least one suction channel or at least one suction pipe with at least one suction opening oriented in the direction of a component platform of the device, wherein the suction channel or the suction pipe is arranged in such a way that, in a predefined standstill position of the coating apparatus outside of the component platform, the suction channel or the suction pipe is operatively connected to a suction device of the device for diverting a gas flow and/or particle flow. In a predefined standstill position of the coating apparatus, the suction channel or the suction pipe docks at the existing suction device of the device, so that the gas flow and/or particle flow existing in the region of a buildup and joining zone of the component platform are or is diverted in such a way that smolder, splatter, particles, and/or process waste gases are conveyed directly, for example, into an overflow tank of the device. The solution in accordance with the invention can be carried out advantageously with relatively low cost in terms of apparatus. The phrases "can be arranged" or "can be introduced" are to be understood in the sense that the suction channel or the suction pipe can be connected directly or indirectly to the coating apparatus. For example, a mechanical connection to the coating apparatus is possible. The coating apparatus according to the invention enables an especially reliable removal of smolder, splatter, particles, and/or process waste gases from a region of a buildup and joining zone when an additive production method is carried out.

In other advantageous embodiments of the coating apparatus according to the invention, the suction channel or the suction pipe is designed as a separate component and arranged at a housing of the coating apparatus. Advantageously, devices that are already present can be retrofitted with an appropriate suction channel or pipe, which is arranged at the coating apparatus, in a straightforward manner for additively producing components. In this case, the suction channel or the suction pipe can be designed as a sheet metal part. However, it is also possible for the suction channel or the suction pipe to be designed in one piece with a housing of the coating apparatus. In this way, the number of components to be used is reduced.

In other advantageous embodiments of the coating apparatus according to the invention, in each case the suction channel or the suction pipe has a first end and a second end, wherein the first end is designed so as to face the suction device and comprises at least one opening and, in the predefined standstill position of the coating apparatus, the opening comes into alignment at least in part with at least one opening of the suction device. In this way, it is ensured that the suction channel or the suction pipe becomes operatively connected to the suction device; that is, a gas- or fluid-conveying connection can be created. In addition, there exists the possibility for the opening of the first end of the suction channel or the suction pipe and/or the opening of the suction device to have a sealing lip. Advantageously, it is possible in this way to enhance the resulting suction effect at the suction channel or pipe. Likewise, the second end of the suction channel or of the suction pipe can be designed to be closed so as to enhance the suction effect.

Further features of the invention ensue from the claims, from the exemplary embodiment of the device according to the invention described below, and on the basis of the drawings. The features and combinations of features mentioned above in the description as well the features and combinations of features mentioned below in the exemplary embodiments can be used not only in the respectively given combination, but also in other combinations, without departing from the scope of the invention. Shown are:

BRIEF DESCRIPTION OF THE DRAWING FIGURES

Figure 2:
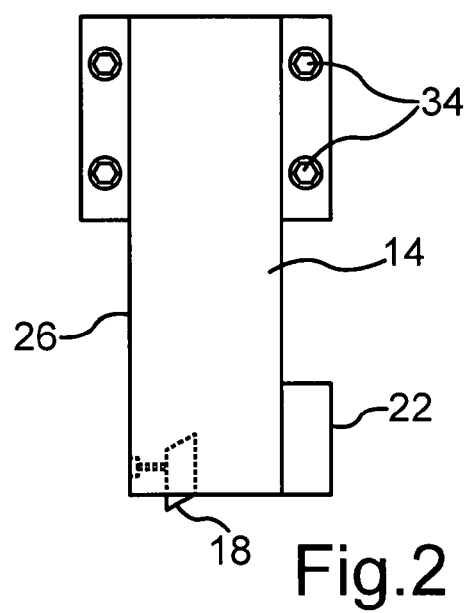

FIG. 1 a schematic illustration of a device according to the invention for producing at least one component region of a component; and FIG. 2 a schematic lateral illustration of the device according to FIG. 1.

DESCRIPTION OF THE INVENTION

FIG. 1 shows a schematic illustration of a device 10 for additively producing at least one component region of a component, in particular a component of a turbomachine. In particular, what is involved here can be a component of a turbine or a compressor of an aircraft engine. The device 10 has a coating apparatus 14 for applying at least one powder layer of a component material (not illustrated) onto at least one buildup and joining zone of a component platform 16, which can be lowered. The movement of the coating apparatus 14 thereby occurs above and along the component platform 16, so that a uniform and layer-by-layer application of the powdered component material onto the component platform 16 is possible. The powdered component material is stored in a stock supply and/or metering tank 12 and is supplied from it, via the coating apparatus 14, into the buildup and joining zone of the component platform 16. On the side facing away from the stock supply and/or metering tank 12, the component platform 16 adjoins an overflow tank 20 for accepting component material, in particular excess component material. For the production of components of a turbine or a compressor of an aircraft engine, powdered component materials made of metal, metal alloys, and/or ceramic are used in particular. However, it is also conceivable to use other suitable materials, such as, for example, plastics.

It can be recognized that a suction channel 22 is arranged at a housing 26 of the coating apparatus 14. In this case, the suction channel 22 has a plurality of suction openings 24 oriented in the direction of the component platform 16. The suction channel 22 is arranged at the coating apparatus 14 in such a way that, in a predefined standstill position of the coating apparatus 14 outside of the component platform 16, said apparatus is operatively connected to a suction device 36 of the device 10 to divert a gas flow and/or particle flow existing in the region of the component platform 16. In the exemplary embodiment illustrated, the mentioned standstill position of the coating apparatus 14 is located in the region of the overflow tank 20. The coating apparatus 14 stays in this position until it is moved once again in the direction of the component platform 16 for application of another component layer and/or in the direction of the stock supply and/or metering tank 12.

It can further be recognized that the device 10 has a gas supply device 28 for supplying at least one gas and/or a process gas into the region of the component platform 16, in particular into the region of the buildup and joining zone. The supply of gas serves for active control of the flow ratios in this region. In addition, it is possible via the gas supply device to supply a process gas in the form of an inert gas to the build-up and joining zone of the component platform 16 for improvement of the joining quality of the resulting component. The process gas can serve also for active control of the flow ratios in this region.

In the exemplary embodiment illustrated, the suction channel 22 has a rectangular cross section. Other cross-sectional forms, such as, for example, a round cross section, are conceivable and possible. It can be recognized that the suction channel 22 has a first end 30 and a second end 32, wherein the first end 30 is designed so as to face the suction device 36 and comprises at least one opening. In the predefined standstill position of the coating apparatus 14, the opening in the first end 30 comes into alignment at least in part with at least one opening of the suction device 36 (not illustrated). In this way, the suction channel 22 becomes operatively connected to the suction device 36; that is, a gas- or fluid-conveying connection can be formed. The second end 32 of the suction channel 22 is designed to be closed so as to enhance the suction effect.

Not illustrated in FIG. 1 for reasons of technical drawing is the coupling of the suction channel 22 to the suction device 36. In practice, however, in the standstill position of the coating apparatus 14, there results a docking of the suction channel 22 to the existing suction device 36, as a result of which a suction effect is created, on the basis of which the gas flow and/or particle flow existing in the region of a buildup and joining zone of the component platform 16 are or is diverted in such a way that smolder, splatter, particles, and/or process waste gases are conveyed directly, for example, into the overflow tank 20 of the device 10.

FIG. 2 shows a schematic lateral illustration of the device 10 according to FIG. 1. It can be recognized that, in the exemplary embodiment illustrated, the suction channel 22 is designed as a separate component and is arranged at the housing 26 of the coating apparatus 14; that is, it is joined to the housing 26. In addition, it can be recognized that the coating apparatus 14 has a blade 18 for application of the powdered component material (not illustrated) layer by layer on the component platform 16. Alternatively to the blade 18, it is also possible to use other smoothing devices, such as, for example, doctor blades, lips, a comb, or rollers. Finally, the coating apparatus 14 has a plurality of fastening devices 34 for connection to a travel device (not illustrated).

The invention claimed is:

1. A device for additively producing at least one component region of a component of a turbomachine, comprising:
   at least one coating apparatus for applying at least one powder layer of a component material onto at least one build-up and joining zone of at least one component platform, which can be lowered, wherein the coating apparatus can be moved in relation to the component platform; and
   at least one suction device for suctioning of process waste gases and/or particles directly from the at least one build-up and joining zone to at least one overflow tank,
   wherein the coating apparatus comprises at least one suction channel or at least one suction pipe with at least one suction opening oriented in the direction of the component platform, wherein the suction channel or the suction pipe is arranged in such a way that, in a predefined standstill position of the coating apparatus outside of the component platform, the suction channel or the suction pipe is operatively connected to the suction device for diverting a gas flow and/or a particle flow directly to the at least one overflow tank, and
   wherein in each case, the suction channel or the suction pipe has a first and a second end, wherein the first end is designed to face the suction device, and comprises at least one opening and, in the predefined standstill position of the coating apparatus, the opening comes into alignment at least in part with at least one opening of the suction device, such that the first end is docked with the at least one opening of the suction device.

2. The device according to claim 1, wherein the suction channel or the suction pipe is a separate component and is arranged at a housing of the coating apparatus.

3. The device according to claim 1, wherein the suction channel or the suction pipe is one piece with a housing of the coating apparatus.

4. The device according to claim 1, wherein the suction device is arranged in a region of an overflow tank and/or in a region of a stock supply and/or metering tank of the device.

5. The device according to claim 1, wherein the device comprises at least one gas supply device for supplying at least one gas and/or one process gas at least into the region of the component platform.

6. The device according to claim 1, wherein the opening of the first end of the suction channel or the suction pipe and/or the opening of the suction device have or has a sealing lip.

7. The device according to claim 1, wherein the second end of the suction channel or the suction pipe is closed.

* * * * *